(12) United States Patent  (10) Patent No.: US 7,668,627 B2
Shultz et al.  (45) Date of Patent: Feb. 23, 2010

(54) MECHANICAL FLIGHT CONTROL AUXILIARY POWER ASSIST SYSTEM

(75) Inventors: Peter M. Shultz, North Richland Hills, TX (US); Carlos A. Fenny, Arlington, TX (US); Todd Walker, Fort Worth, TX (US); Sam Arjunan, Great Mills, MD (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 387 days.

(21) Appl. No.: 11/664,664

(22) PCT Filed: Oct. 13, 2005

(86) PCT No.: PCT/US2005/036714

§ 371 (c)(1),
(2), (4) Date: Apr. 4, 2007

(87) PCT Pub. No.: WO2006/137908

PCT Pub. Date: Dec. 28, 2006

(65) Prior Publication Data

US 2008/0065278 A1    Mar. 13, 2008

(51) Int. Cl.
*G01C 23/00* (2006.01)
(52) U.S. Cl. .......................... 701/3; 701/13; 244/117 R
(58) Field of Classification Search .................... 701/3, 701/10, 11, 13; 244/17.13, 117 R
See application file for complete search history.

(56) References Cited

U.S. PATENT DOCUMENTS 4,573,125 A * 2/1986 Koenig .......................... 701/3
5,060,889 A * 10/1991 Nadkarni et al. ............ 244/183

* cited by examiner

*Primary Examiner*—Gertrude Arthur Jeanglaud
(74) *Attorney, Agent, or Firm*—James E. Walton

(57) ABSTRACT

A mechanical flight control system for a rotary-wing aircraft is disclosed. The flight control system comprises an upstream portion, a downstream portion, and a booster means for connecting the upstream portion to the downstream portion. The booster means may comprise dual concentric valve actuators and/or a variety of system load limiting features.

15 Claims, 7 Drawing Sheets

MECHANICAL FLIGHT CONTROL AUXILIARY POWER ASSIST SYSTEM

GOVERNMENT LICENSE RIGHTS

The U.S. Government has a paid-up license in this invention and the right in limited circumstances to require the patent owner to license others on reasonable terms as provided for by the terms of Contract No. N00019-96-C-0128 awarded by NAVAIR.

TECHNICAL FIELD

The present invention relates to the field of mechanical flight control systems.

DESCRIPTION OF THE PRIOR ART

Mechanical flight control systems (MFCSs) have been in use for many years for aiding in the control of various types of aircraft. A MFCS typically used in helicopters is a cyclic control system (CCS). A CCS commonly includes a pilot input device, usually a stick controlled by the right hand of a pilot, connected to hydraulic actuators by various mechanical linkages. The hydraulic actuators are often arranged to connect to and cause changes in the physical orientation of a swash plate. Lateral, forward, and aft movement control of the helicopter is primarily controlled by the physical orientation of the swash plate. A CCS is normally designed such that when a pilot displaces a cyclic stick from a centered position, the attached mechanical linkages cause the actuators to adjust the physical orientation of the swash plate such that the helicopter tends to move in the direction of the stick movement.

A CCS is often described as having particular mechanical characteristics. The mechanical characteristic of a CCS are typically summarized as the effective forces perceived by the pilot through the cyclic stick as the pilot manipulates the cyclic stick. The CCS is normally designed to be balanced such that such that without pilot intervention, the cyclic stick centers to a position called "trim position". When the cyclic stick is centered or at trim position, no lateral, forward, or aft movement of the helicopter occurs due to the CCS. The major contributing forces which combine to establish the mechanical characteristic of a CCS include: (1) a "breakout force" or "return-to-center force" which is a constant force applied toward centering the cyclic stick to trim position despite how far the cyclic stick is displaced and despite at what velocity the cyclic stick is moved, (2) a "gradient force" or "spring force" that also returns the cyclic stick to a centered position but varies with how far the cyclic stick is displaced from trim position such that the farther the cyclic stick is moved, the stronger the force applied toward centering the cyclic stick to trim position, (3) a constant "friction force" that is opposite to the direction of cyclic stick movement, (4) a "damping force" opposite to the direction of cyclic stick movement and which varies with the velocity at which the cyclic stick is moved, and (5) a "hard stop force" which simulates a mechanical limit of travel of the cyclic stick.

The sources of the above described forces vary. Breakout force often emanates from the combination of mechanical balancing of a CCS, the breakout friction force associated with the joints connecting the various mechanical linkages, and the spring preload force associated with the force-gradient cartridges. Gradient force and spring preload both typically primarily emanate from the inclusion of "force-gradient cartridges" situated along a force path between the cyclic stick and the connection to swash plate actuators. Force-gradient cartridges are typically canisters comprising bi-directional spring elements. Hard stop forces are normally forces transmitted to the cyclic stick for purposes of informing the pilot that the CCS is at its control limit for the current directional command.

Automatic flight control systems (AFCSs) are often incorporated into CCSs such that motors or other devices provide mechanical input to the CCS resulting in automated holding of the cyclic stick and/or automated adjustment of the "trim position". It is common to incorporate a "trim release button" on the cyclic stick which allows the pilot to move the cyclic to any desired position and then release the trim release button to command the AFCS to hold the current cyclic stick position. Often, the "trim position" or "attitude" can be adjusted by moving a four-way thumb switch on the cyclic stick. If a CCS has good mechanical characteristics, it is easy for the pilot to "push through" the cyclic stick position held by the AFCS by applying force to the cyclic stick without disengaging the AFCS.

If the friction forces of a CCS are too high and/or the mechanical leverage offered by the cyclic stick design is too low, significant negative impacts on the mechanical characteristics of the CCS may exists. For example, a cyclic stick offering a lowered mechanical leverage results in higher breakout forces and amplifies CCS mechanical imbalance resulting in poor control harmony. Where frictional forces cannot otherwise be reduced adequately to accommodate the low leverage cyclic stick, force-gradient cartridges fail to provide proper levels of spring force. With low spring force levels, poor cyclic stick centering occurs during manual operation of CCS and the AFCS is prevented from "back-driving" the CCS. While the above described MFCS advancements represent significant developments in MFCS design, considerable shortcomings remain.

SUMMARY OF THE INVENTION

There is a need for an improved mechanical flight control system.

Therefore, it is an object of the present invention to provide an improved mechanical flight control system which provides a lower perceived system friction.

This object is achieved by providing a CCS in which a cyclic secondary boost actuator is connected in a parallel load path between an upstream portion of the CCS and a downstream portion of the CCS.

The present invention provides significant advantages, including: (1) improved cyclic stick centering to the trim position; (2) masking from the pilot all friction and mass imbalances associated with the downstream portion of the CCS; (3) allowing pilot to perceive the friction associated with only the upstream portion of the CCS, and (4) providing back-driving or push through capability during use of an AFCS of a CCS with unequal friction forces in the upstream portion of a CCS and the downstream portion of the same CCS.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention is an improved mechanical flight control system (MFCS) which allows an upstream portion of the MFCS to operate with lower friction and lower preloads than a downstream portion of the MFCS. While specific reference is made to a cyclic control system CCS for a helicopter, the present invention may alternatively be incorporated with any other mechanical control system where operating an upstream input control portion having lower friction than a downstream output control portion is desired and/or is beneficial.

Figure 1:
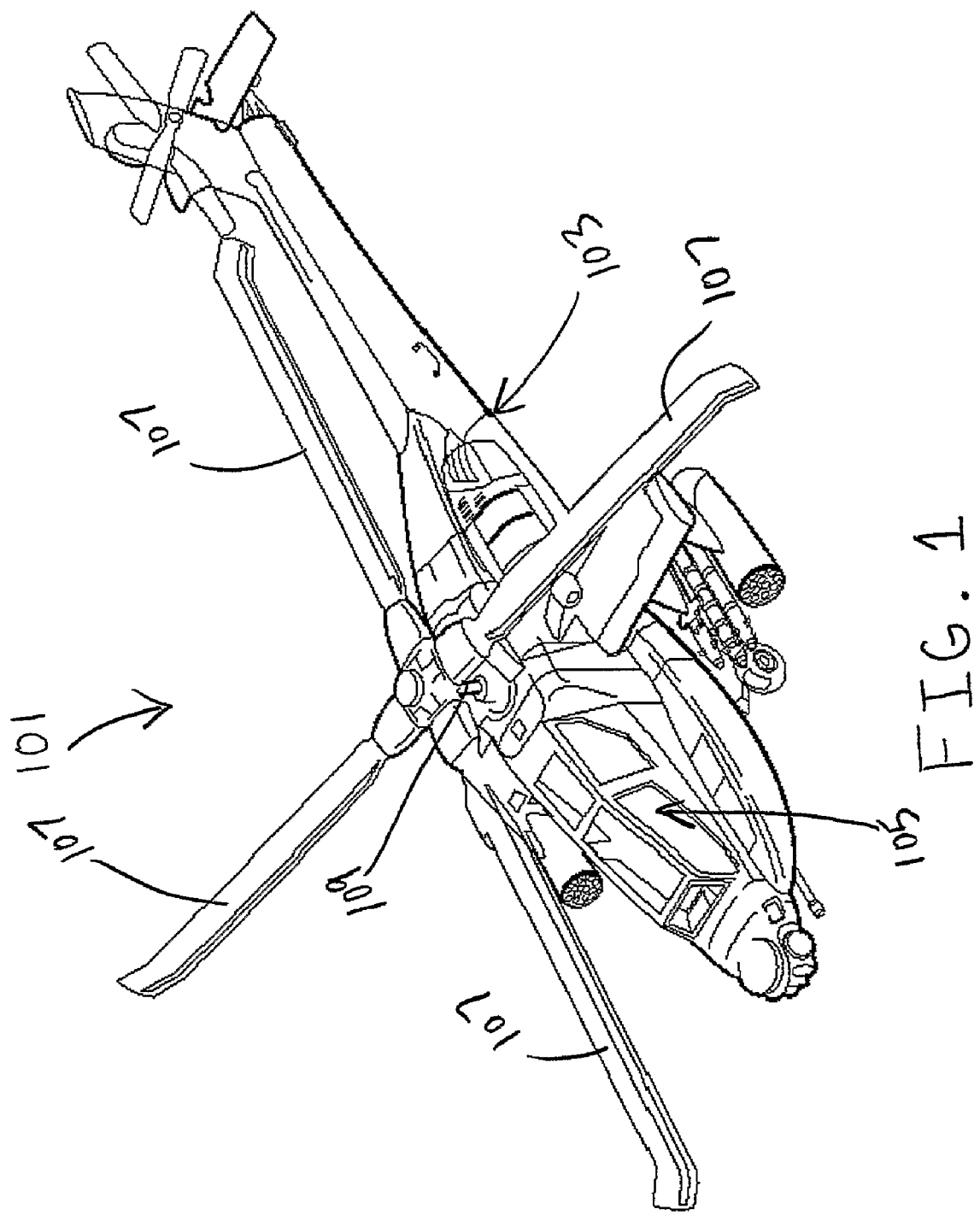
FIG. 1 is a perspective view of the preferred embodiment of a helicopter according to the present invention.

FIG. 1 depicts a helicopter 101 incorporating a CCS (not shown) according to the present invention. Helicopter 101 has a fuselage 103, a crew compartment 105, and rotor blades 107 powered by a power plant (not shown) and driven by a mast 109. Cyclic sticks (not shown) of CCS and other portions (not shown) of CCS are located within crew compartment 105 where a pilot and copilot are seated during operation of helicopter 101. Helicopter 101 also has a swash plate (not shown) which is physically manipulated in part by CCS. Physical manipulations of the swash plate results in altered cyclic control outputs. Of course CCS may optionally include an auto-pilot feature for controlling a cyclic input.

Figure 2:
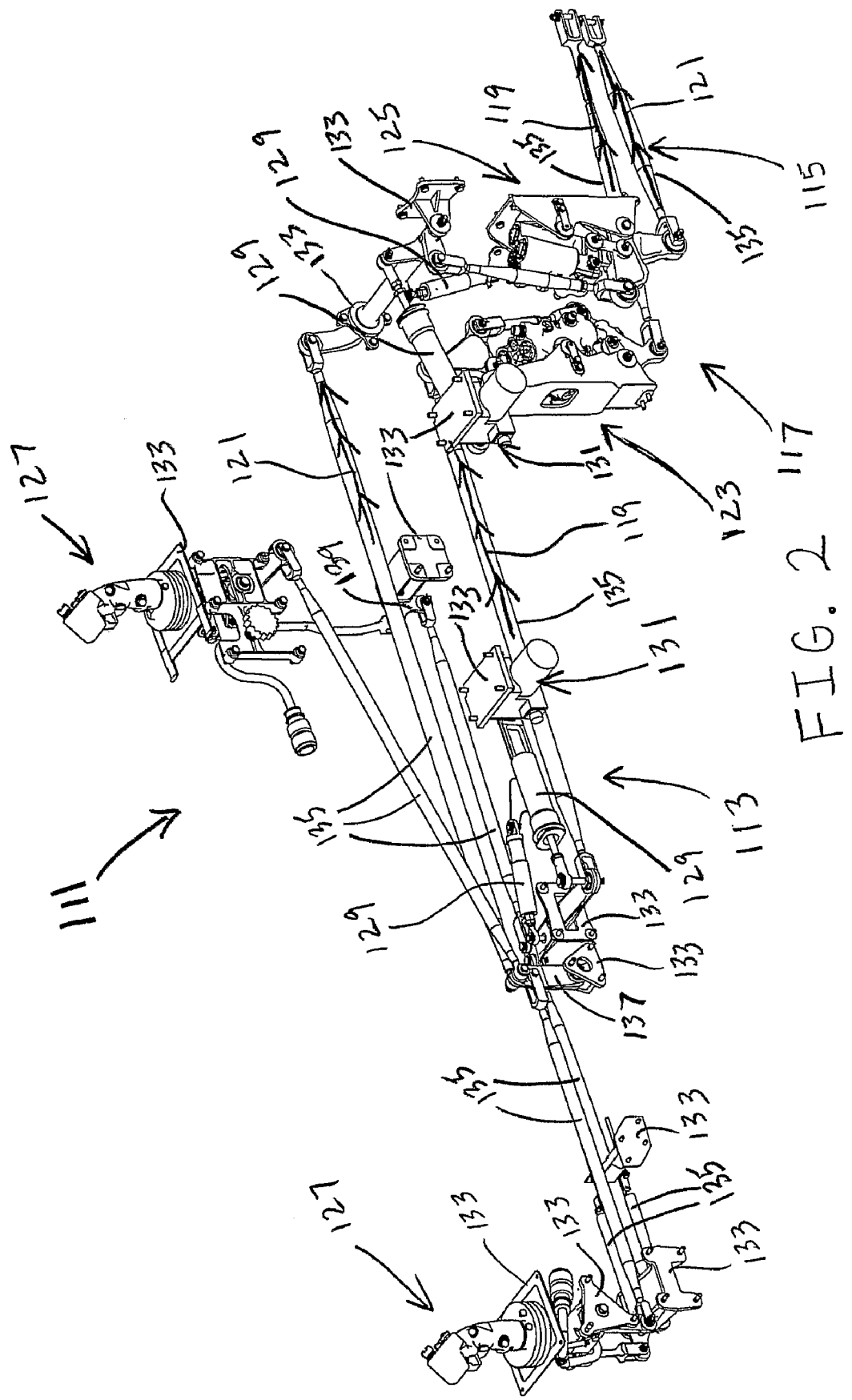
FIGS. 2 and 3 are perspective views of the preferred embodiment of a CSS according to the present invention.
Figure 3:
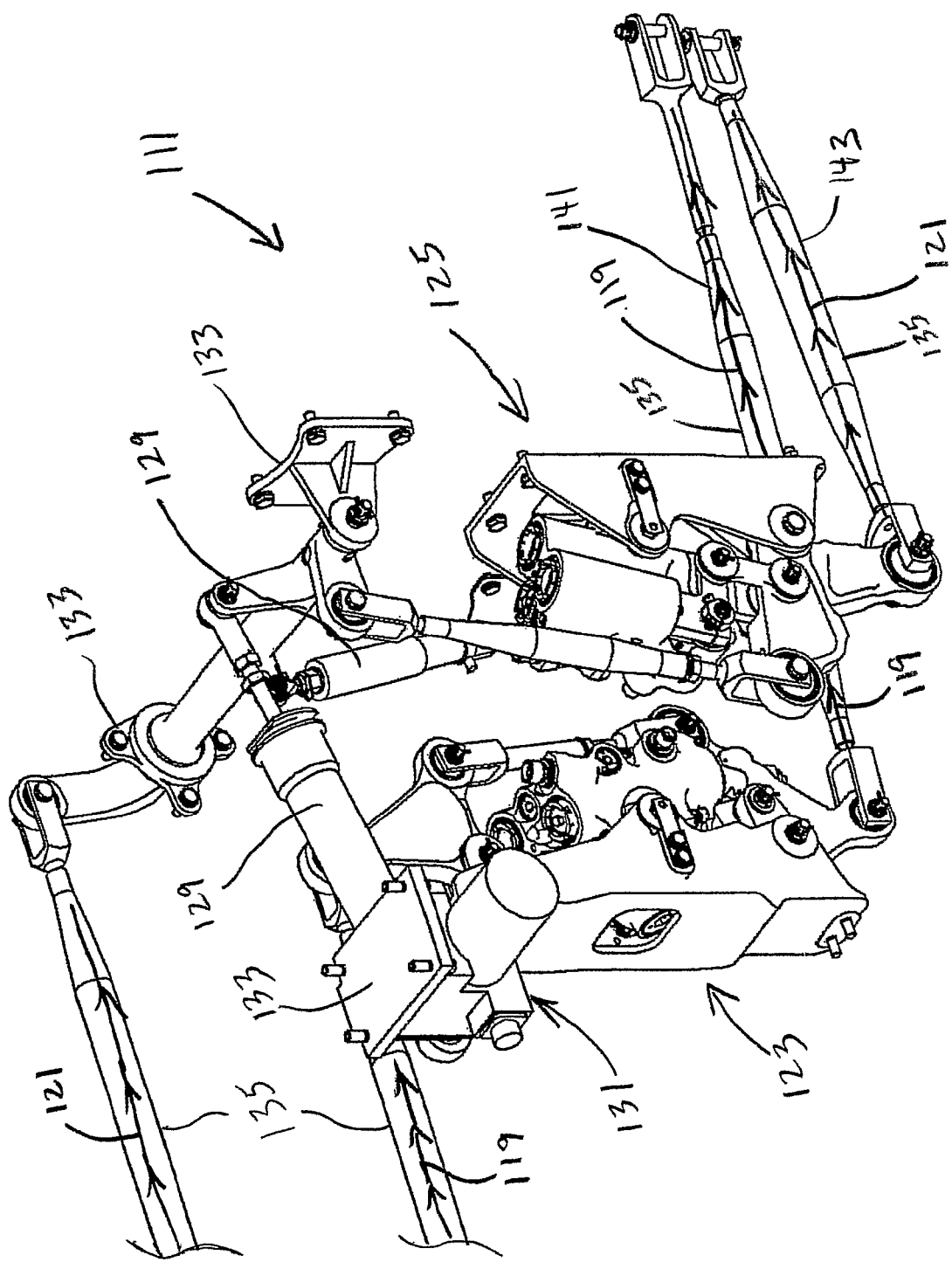
Figure 4:
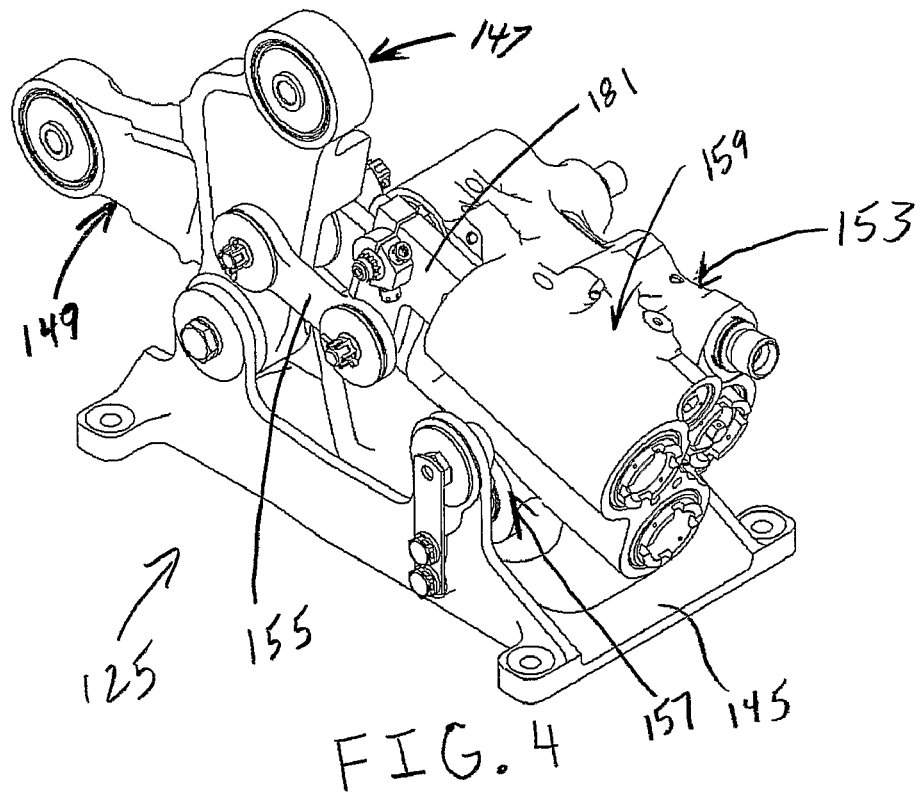
FIGS. 4-7 are perspective and side views of a longitudinal boost assembly of the CSS of FIGS. 2 and 3.
Figure 5:
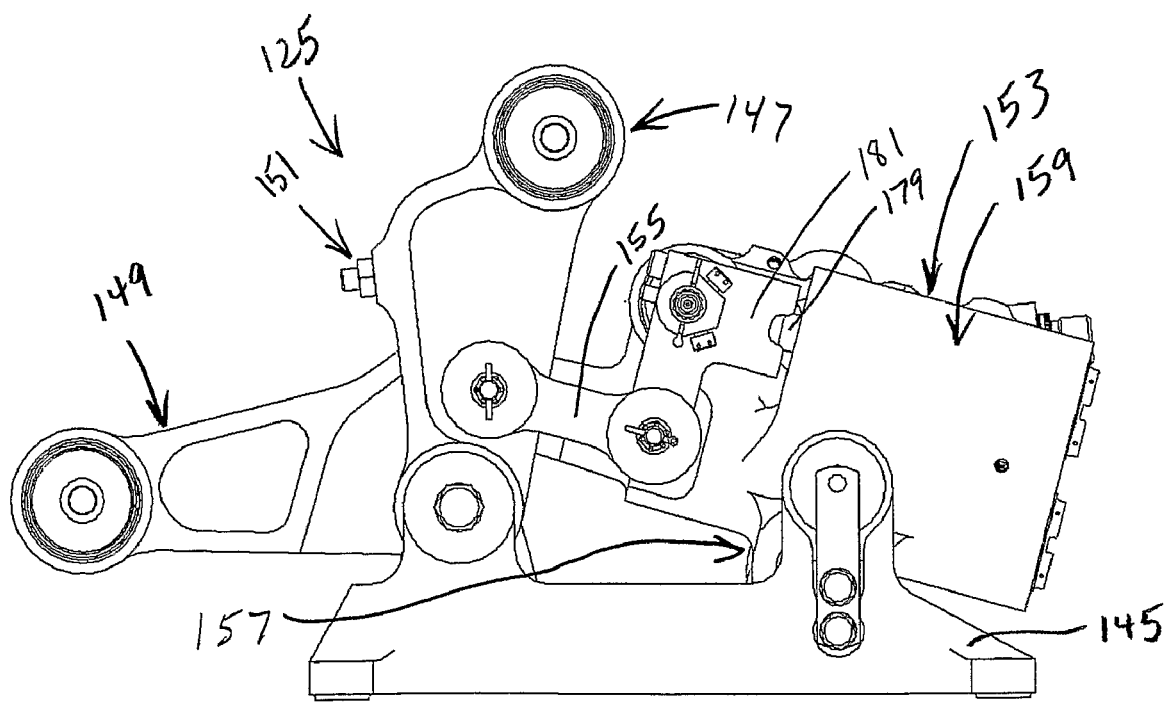
Figure 6:
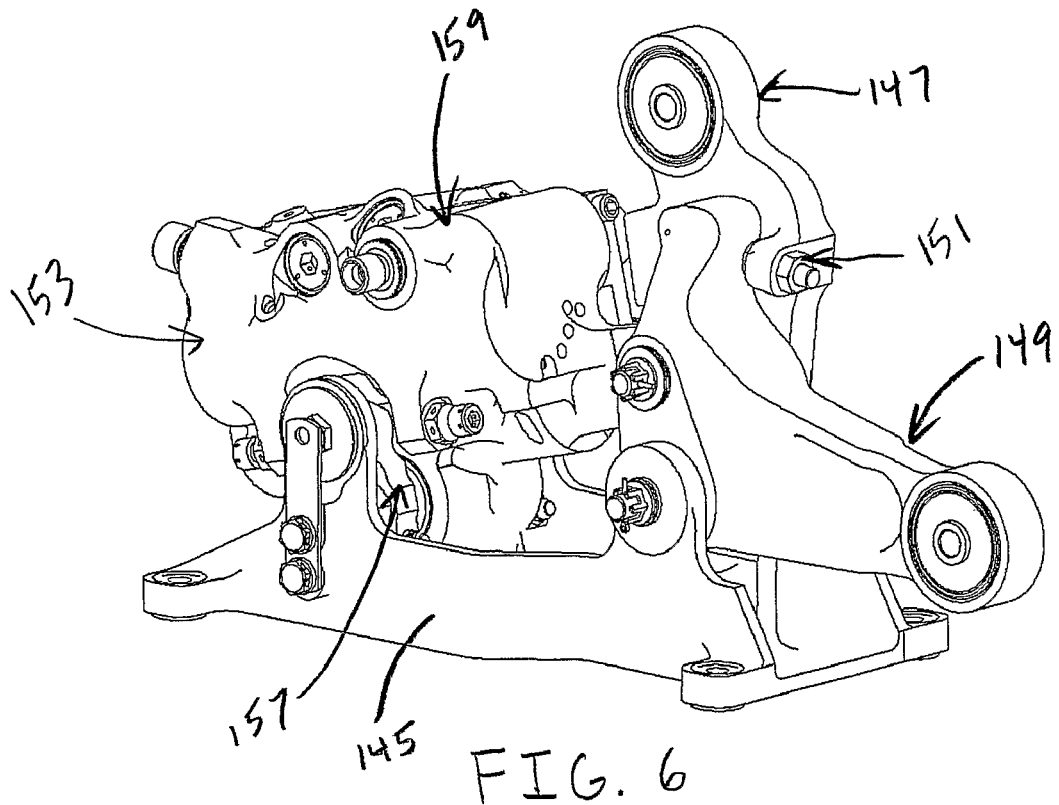
Figure 7:
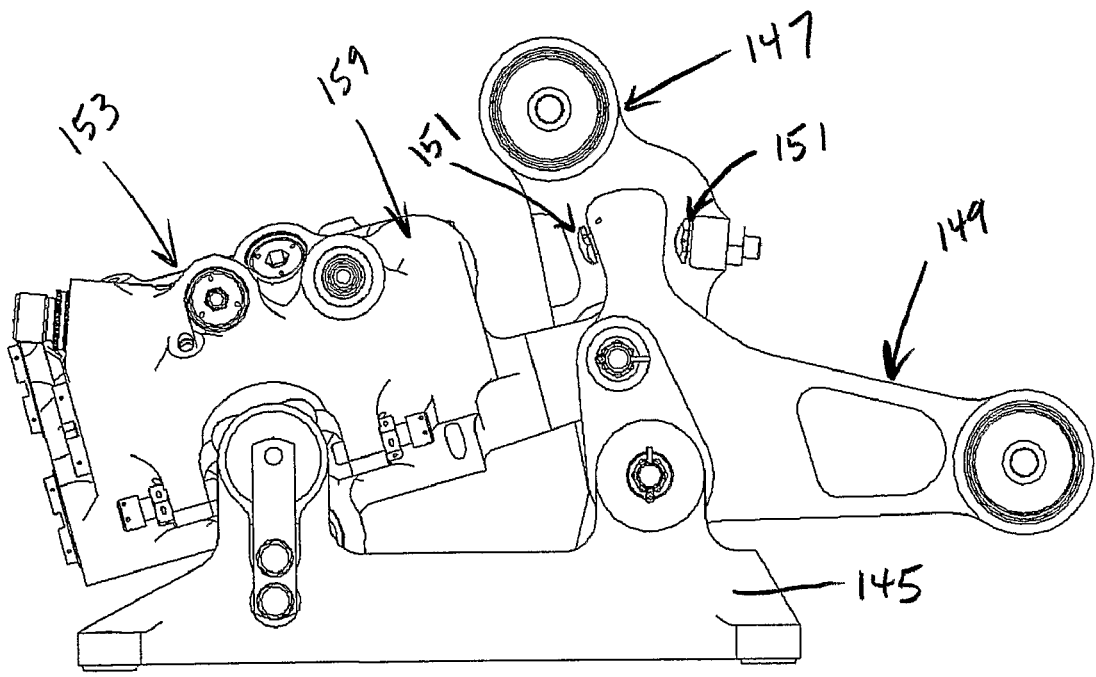
Figure 8:
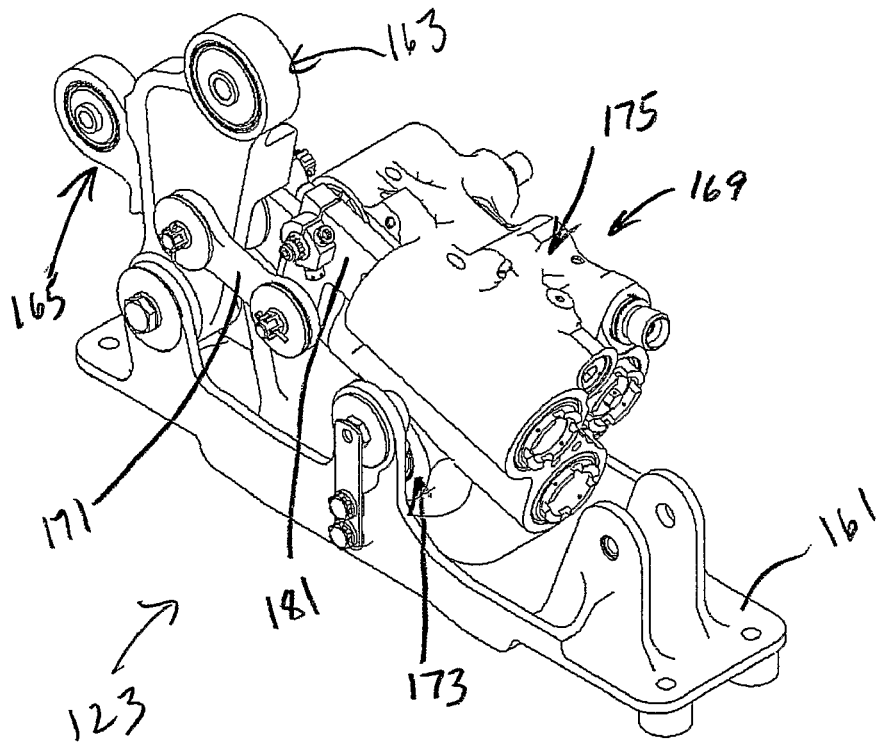
FIGS. 8-11 are perspective and side views of a lateral boost assembly of the CSS of FIGS. 2 and 3.
Figure 9:
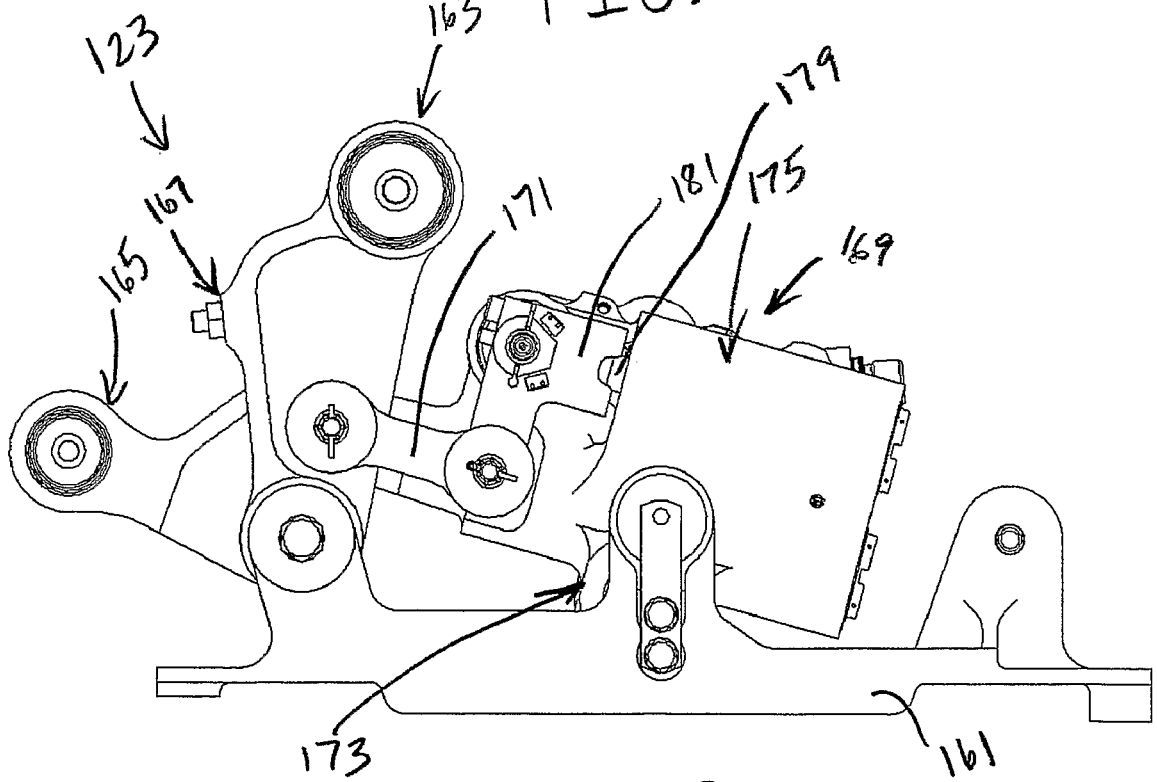
Figure 10:
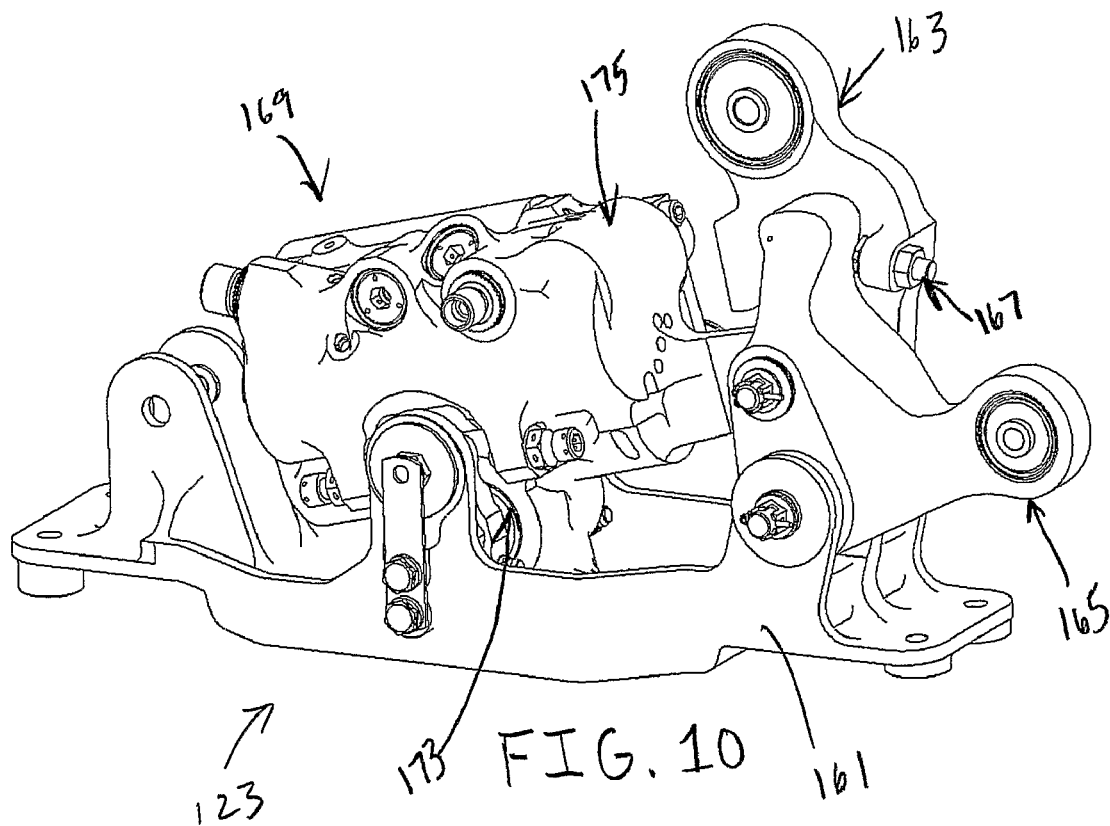
Figure 11:
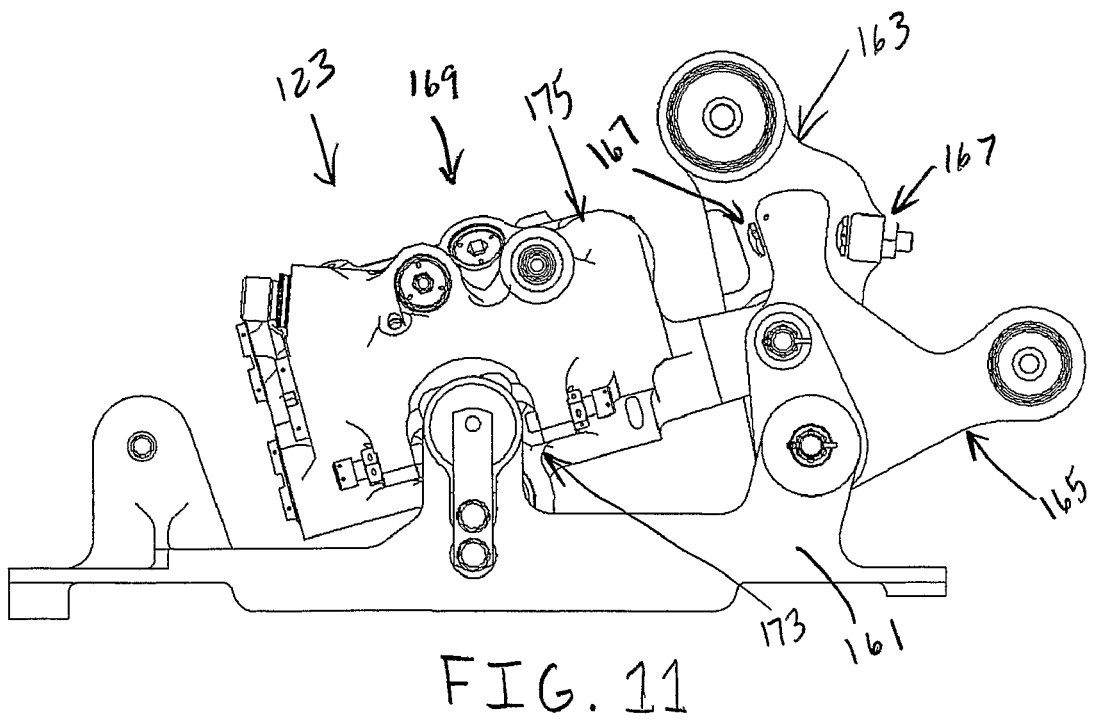

Referring now to FIGS. 2 and 3 in the drawings, perspective views of the preferred embodiment of a CCS according to the present invention are illustrated. CCS 111 comprises an upstream portion 113, a downstream portion 115, and a boosting means 117 connected to both upstream portion 113 and downstream portion 115. CCS 111 also comprises a lateral load path 119 and a longitudinal load path 121. In this embodiment of the present invention, boosting means 117 comprises a lateral boost assembly 123 and a longitudinal boost assembly 125. Generally, boost assemblies 123, 125 are installed parallel to the convention direct load path rather than in series with the conventional direct load path. Forces are transferred from upstream portion 113 of lateral load path 119 to downstream portion 115 of lateral load path 119 through lateral boost assembly 123. Forces are transferred from upstream portion 113 of longitudinal load path 119 to downstream portion 115 of longitudinal load path 119 through longitudinal boost assembly 125. Both lateral boost assembly 123 and longitudinal boost assembly 125 may be shaped, sized, and otherwise adapted to achieve a particular input/output leverage ratio between various system elements. Upstream portion 113 has lower inherent friction than downstream portion 115.

Upstream portion 113 and downstream portion 115 of CCS further comprise cyclic sticks 127 and associated buttons (not labeled) for inputting pilot commands by moving sticks 127 and pressing buttons, force-gradient cartridges 129 for introducing spring force to CCS 111 mechanical characteristics, trim motor assemblies 131 for actuating CCS 111 elements during autopilot use, and various fixed mounts 133 (all not labeled) for attaching stationary portions of CCS 111 to stationary features (not shown) of interior portions of a helicopter fuselage (not shown) such that movable interlinked elements such as tubular control linkages 135 (not all labeled), mechanical idlers 137 (not all labeled), and mechanical bellcrancks 139 (not all labeled) are movable with relation to the stationary features of interior portions of the helicopter fuselage. While bearings are typically used to connect discreet linking elements, bearings are not labeled. A lateral output linkage 141 and a longitudinal output linkage 143 transmit forces from lateral boost assembly 123 and longitudinal boost assembly 125, respectively, to other structures (not shown) which ultimately control swash plate actuators (not shown). The swash plate actuators are hydraulic actuators controlled and activated by movements of lateral output linkage 141 and a longitudinal output linkage 143.

Referring now to FIGS. 4-7, the preferred embodiment of longitudinal boost assembly 125 is illustrated. Assembly 125 is a unity feedback, moving body hydro-mechanical device. Longitudinal boost assembly 125 comprises a longitudinal boost assembly mount 145, longitudinal boost assembly input lever 147 hingedly attached to mount 145, longitudinal boost assembly output lever 149 also hingedly attached to mount 145, longitudinal boost assembly adjustable hard stops 151, longitudinal boost assembly hydraulic unit 153, and longitudinal direct link 155. Hard stops 151 are adjusted to contact input lever 147 and output lever 149 before over-travel of CCS 111 components occurs. Hydraulic unit 153 comprises a hinged portion 157 hingedly attached to mount 145 and a translating portion 159 attached to hinged portion 157 such that translating portion 159 may translate along hinged portion 157. Translating portion 159 is also hingedly attached to output lever 149. Hinged portion 157 is connected to input lever 147 with direct link 155 which is connected to a piston locking bar 181 (discussed infra) for actuating a control piston 179 (discussed infra) such that if input lever 147 is moved toward hydraulic unit 153, direct link 155 moves locking bar 181 to actuate hydraulic unit 153 in a manner causing translating portion 159 to translate along hinged portion 157 in the direction of movement supplied by input lever 147. Similarly if input lever 147 is moved away from hydraulic unit 153, direct link 155 moves locking bar 181 to actuate hydraulic unit 153 in a manner causing translating portion 159 to translate along hinged portion 157 in the direction of movement supplied by input lever 147. Of course as translating portion 159 moves, output lever 149 also moves in a manner dictated by the geometry of interconnection of the two elements.

Referring now to FIGS. 8-11, the preferred embodiment of lateral boost assembly 123 is illustrated. Assembly 123 is a unity feedback, moving body hydro-mechanical device. Lateral boost assembly 123 comprises a lateral boost assembly mount 161, lateral boost assembly input lever 163 hingedly attached to mount 161, lateral boost assembly output lever 165 also hingedly attached to mount 161, lateral boost assembly adjustable hard stops 167, lateral boost assembly hydraulic unit 169, and lateral direct link 171. Hard stops 167 are adjusted to contact input lever 163 and output lever 165 before over-travel of CCS 111 components occurs. Hydraulic unit 169 comprises a hinged portion 173 hingedly attached to mount 161 and a translating portion 175 attached to hinged portion 173 such that translating portion 175 may translate along hinged portion 173. Translating portion 175 is also hingedly attached to output lever 165. Hinged portion 173 is connected to input lever 163 with direct link 171 which is connected to a piston locking bar 181 (discussed infra) for actuating a control piston 179 (discussed infra) of such that if input lever 163 is moved toward hydraulic unit 169, direct link 171 moves locking bar 181 to actuate hydraulic unit 169 in a manner causing translating portion 175 to translate along hinged portion 173 in the direction of movement supplied by input lever 163. Similarly if input lever 163 is moved away from hydraulic unit 169, direct link 171 moves locking bar 181 to actuate hydraulic unit 169 in a manner causing translating portion 175 to translate along hinged portion 173 in the direction of movement supplied by input lever 163. Of course as translating portion 175 moves, output lever 165 also moves in a manner dictated by the geometry of interconnection of the two elements.

Both hydraulic units 153, 167 are powered by a single hydraulic system (not shown). Assemblies 123, 125 integrate features which minimize impacts to CCS mechanical characteristics even in the event of loss of hydraulic supply pressure failure. For example, to maintain aircraft control when supply pressure is lost, pressure-operated bypass locking valves (not shown) release internal actuator pins 179 to a non-pressure assisted position which subsequently allows control pistons 179 to extend from translating portions 159, 175. When extended from translating portions 159, 175, pistons 179 are engaged with locking bars 181, thereby precluding freeplay movement of system elements due to internal valve travel. Also, fluid flow between multiple internal cylinders is allowed while the input levers 147, 163 are fixed to translating portions 159, 175, respectively, such that instead of introducing freeplay into CCS 111, hydraulic units 153, 169 merely act as viscous dampers. Further, to prevent overloading of the elements of downstream portion 115, hydraulic units 153, 169 incorporate dual concentric main control valves that port hydraulic pressure to return channels before stops 151, 167 contact the respective input and output levers. This function disables the hydraulic unit 153, 169 output just prior to the pilot being able to transmit more load to the elements of CSS 111 than the elements are structurally designed to withstand.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A mechanical flight control system for an aircraft, comprising:
    an upstream portion having an upstream portion friction;
    a downstream portion having a downstream portion friction; and
    a boosting means for connecting the upstream portion to the downstream portion, the boosting means comprising a boost assembly, the boost assembly comprising:
    a mount for connecting the boost assembly to the aircraft;
    an input lever connected to the upstream portion and hingedly connected to the mount;
    an output lever connected to the downstream portion and hingedly connected to the mount;
    a hydraulic unit connected to the input lever and to the output lever, the hydraulic unit having a hinged portion that is hingedly connected to the mount, and further having a translating portion that is connected to the hinged portion such that the translating portion can translate along the hinged portion.

2. The mechanical flight control system of claim 1, wherein the upstream portion is adapted to accept cyclical control input.

3. The mechanical flight control system of claim 1, wherein the downstream portion is adapted to output cyclical control output.

4. The mechanical flight control system of claim 1, wherein the hydraulic unit comprises a hydraulic actuator.

5. The mechanical flight control system of claim 4, wherein the hydraulic actuator is a dual concentric valve hydraulic actuator.

6. The mechanical flight control system of claim 4, wherein the hydraulic actuator is adapted to port pressure to a return channel before a selected system load is achieved.

7. The mechanical flight control system of claim 4, wherein the boosting means is adapted to prevent system freeplay due to a loss of a hydraulic supply pressure.

8. The mechanical flight control system of claim 7, wherein the boosting means comprises a control piston adapted for automatic retraction when a selected hydraulic supply pressure is not supplied to the boosting means.

9. The mechanical flight control system of claim 1, wherein the upstream portion and downstream portion are adapted such that the upstream portion friction is a value lower than the downstream portion friction.

10. The mechanical flight control system of claim 1, wherein the boosting means is incorporated into a load path parallel to a conventional load path.

11. The mechanical flight control system according to claim 1, wherein the translating portion of the hydraulic unit is hingedly connected to the output lever and the hinged portion of the hydraulic unit is connected to the input lever.

12. The mechanical flight control system according to claim 1, wherein the boost assembly is a longitudinal boost assembly, and wherein the boosting means further comprises a lateral boost assembly.

13. A method of improving a mechanical characteristic of a mechanical flight control system, comprising the steps of:
    identifying a conventional mechanical flight control system having a detrimentally high system friction value; and
    integrating a boosting means parallel to a conventional load path, the conventional load path connecting a mechanical flight control system input and an associated output,
    wherein the boosting means comprises a boost assembly, the boost assembly comprising:
    a mount for connecting the boost assembly to the aircraft;
    an input lever connected to the upstream portion and hingedly connected to the mount;
    an output lever connected to the downstream portion and hingedly connected to the mount;
    a hydraulic unit connected to the input lever and to the output lever, the hydraulic unit having a hinged portion that is hingedly connected to the mount, and further having a translating portion that is connected to the hinged portion such that the translating portion can translate along the hinged portion.

14. The method of improving a mechanical characteristic of a mechanical flight control system of claim 13, further comprising the step of:
    adapting the boosting means to maintain an existing input/output leverage ratio between at least two selected mechanical control system elements.

15. The method of improving a mechanical characteristic of a mechanical flight control system of claim 13, wherein the hydraulic unit comprises a hydraulic actuator.

* * * * *